No. 810,976. PATENTED JAN. 30, 1906.
W. PORTEN.
MOLD FOR BUILDING BLOCKS.
APPLICATION FILED JUNE 13, 1904.
3 SHEETS—SHEET 2.
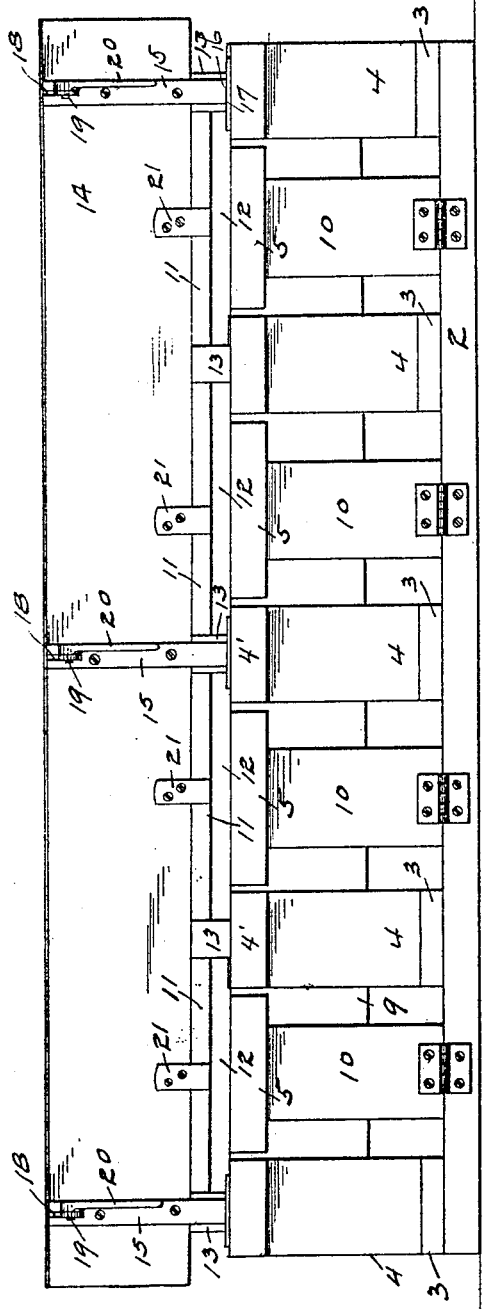
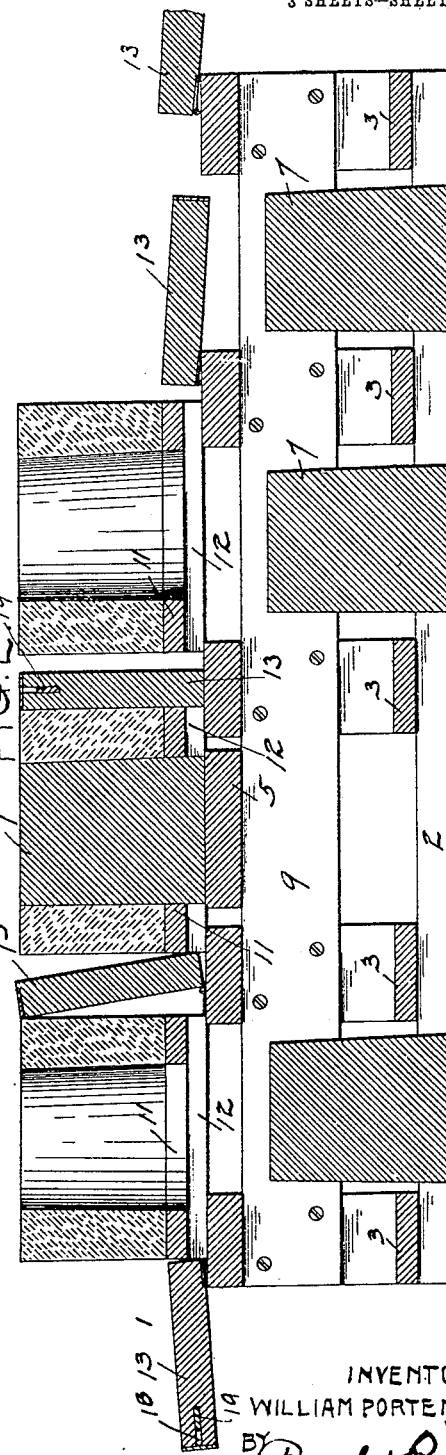
WITNESSES
M. McInnis
M. Hagerty
INVENTOR
WILLIAM PORTEN
BY Paul & Paul
HIS ATTORNEYS No. 810,976.　　　　　　　　　　　　　　　PATENTED JAN. 30, 1906.
W. PORTEN.
MOLD FOR BUILDING BLOCKS.
APPLICATION FILED JUNE 13, 1904.
3 SHEETS—SHEET 3.
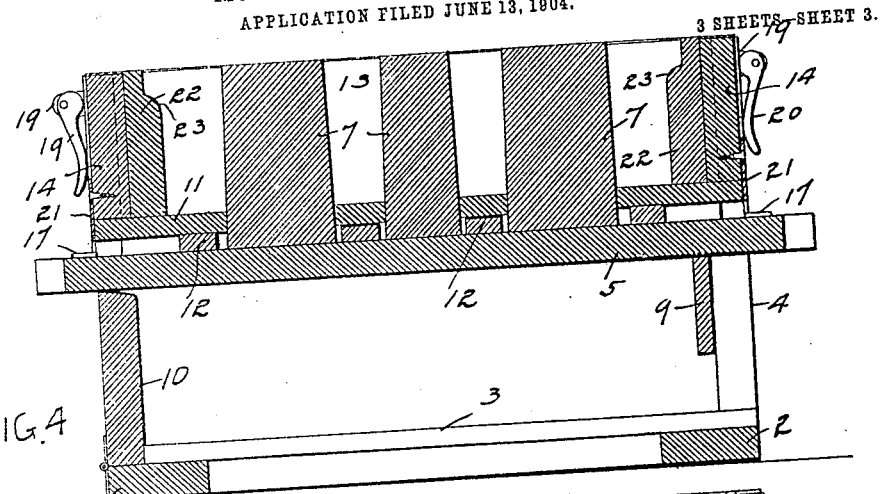
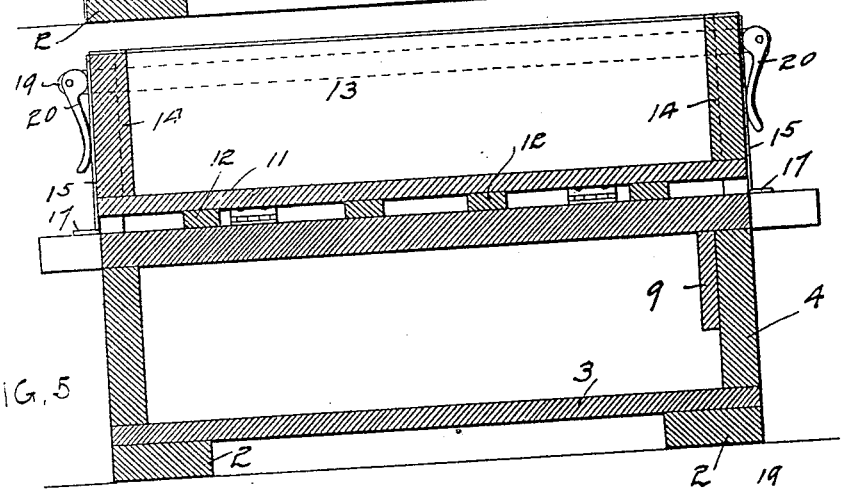
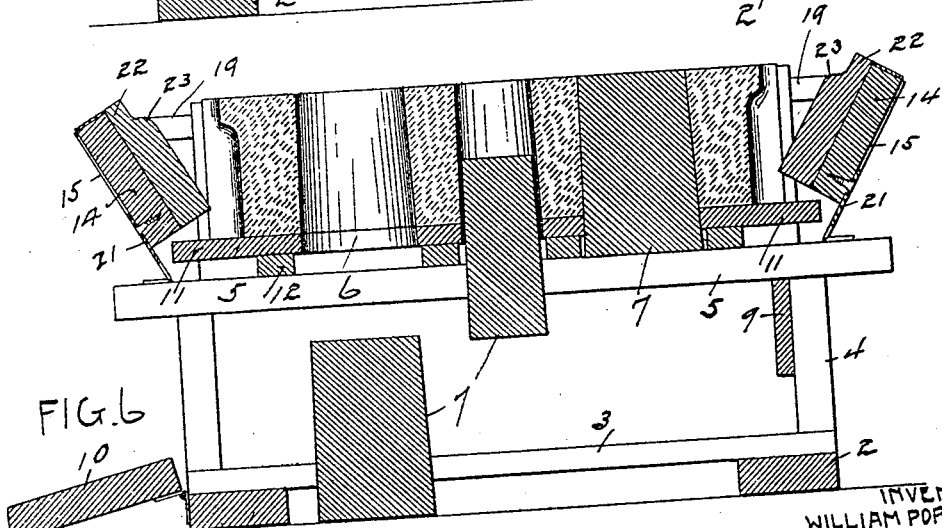
WITNESSES
M. M. Innis
M. Hagerty
INVENTOR
WILLIAM PORTEN
BY Paul Paul
HIS ATTORNEYS

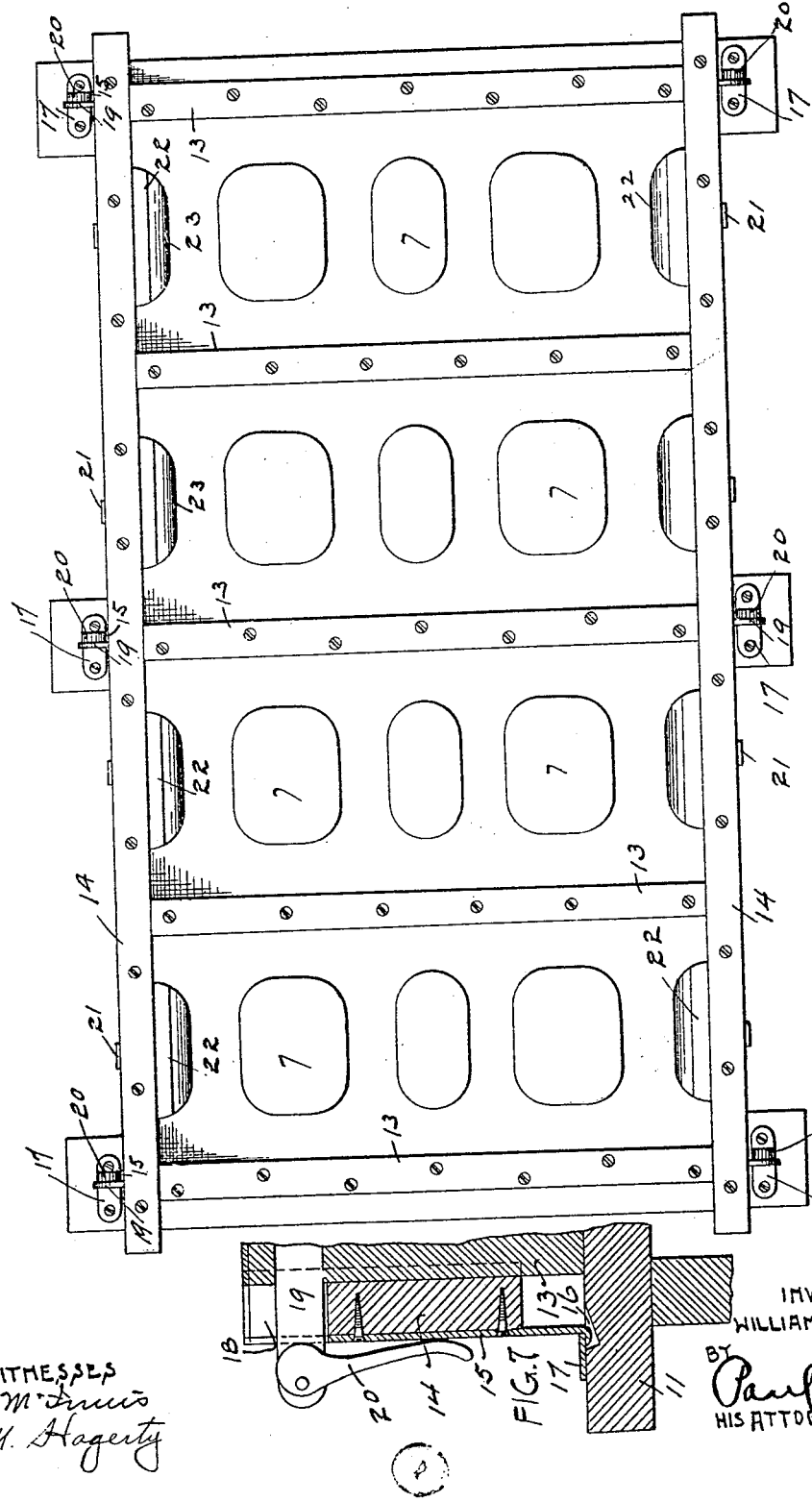

UNITED STATES PATENT OFFICE.

WILLIAM PORTEN, OF ST. PAUL, MINNESOTA.

MOLD FOR BUILDING-BLOCKS.

No. 810,976.          Specification of Letters Patent.          Patented Jan. 30, 1906.

Application filed June 13, 1904. Serial No. 212,258.

*To all whom it may concern:*

Be it known that I, WILLIAM PORTEN, of St. Paul, Ramsey county, Minnesota, have invented certain new and useful Improvements in Molds for Building-Blocks, of which the following is a specification.

My invention relates to molds wherein artificial building-blocks can be easily and quickly formed; and the object of my invention is to provide a mold from which each block as it is molded can be conveniently removed to a suitable place to dry and the mold utilized for forming another block.

Other objects of the invention will appear from the following detailed description.

The invention consists generally in various constructions and combinations, all as hereinafter described, and particularly pointed out in the claims.

In the accompanying drawings, forming part of this specification, Figure 1 is a plan view of a building-block mold embodying my invention. Fig. 2 is a side elevation of the same. Fig. 3 is a longitudinal vertical section showing the position of the blocks in the mold ready to be removed. Fig. 4 is a transverse vertical section showing the block in the mold. Fig. 5 is a similar view with the block removed. Fig. 6 is also a transverse vertical section showing the side wall swung outwardly from the ends of the block and the cores being discharged from the core-holes. Fig. 7 is a detail of the mechanism for locking the side and partition-walls together.

In the drawings, 2 represents suitable base-timbers connected by cross-bars 3 and provided with upright posts or standards 4, on which bars 4' are supported. Upon the bars 4, I provide a series of removable floors 11, provided with longitudinally-arranged core-holes 6 substantially oval in form, the one in the middle being of less width than those at the outside. Suitable cross-bars 12 are provided on these removable floors to raise them a suitable distance above the bars 5 for convenience in elevating and removing the finished blocks, it being my intention to provide a large number of these temporary or removable floors, so that as fast as the blocks are molded they can be removed and put in a suitable place to dry and another floor placed in the mold and the operation continued. Within the core-holes 6 correspondingly-shaped cores 7 are arranged, tapered from the bottom toward the top and adapted to be inserted into the core-holes from above and discharged into the space beneath the floor 11. Any suitable means may be provided for temporarily supporting these cores during the operation of molding; but I prefer to provide a series of bars 5, one for each row of core-holes, supported at one end upon a plate 9, that connects the upright standards 4, and at their other ends held in a horizontal position by means of standards 10, that are hinged to the base-timbers 2 and adapted to swing outwardly and allow the bars 5 to be removed when it is desired to discharge the cores after the molding operation.

The floors 11 are separated from one another to form individual or independent molds by partition-walls 13, that are hinged at their lower edges to the bars 4', with the exception of the middle partition-wall of the series, which is rigidly secured, as shown in Fig. 3. These partition-walls are hinged to facilitate the removal of the blocks. A mold having been filled, the workmen will unlock the side and partition walls and swing the former outwardly to clear the blocks and then beginning at one end or both ends of the mold will turn the partition-walls down to a horizontal position and remove the blocks. After the walls are swung down, as shown in Fig. 3, each block can be lifted out of its individual mold without the necessity of raising it over the top of the partition-wall, which would be necessary if the wall remained in an upright position.

The side walls 14 are provided with depending straps 15, having outwardly-turned ends that fit in recesses 16 in the ends of the bars 4' and are held therein when the wall is in an upright position by a plate 17. When the walls are swung outwardly to the position shown in Fig. 6, they can be lifted vertically and the hooked ends of the straps disengaged from the recesses. This construction I have shown in several prior cases for similar inventions, and I make no claim to the same herein. The side walls are also provided with slots 18 to receive bars 19, provided in the upper edges of the partition-walls 13. These bars are adapted to carry cam-levers 20, by means of which the side and partition walls are drawn snugly together and locked during the molding operation. I also provide straps 21 on the lower edges of the side walls to engage the ends of the movable floors 11 and hold them in place while the mold is being filled. The side walls are also provided with fixed cores 22, which cause the formation of recesses in the ends of the blocks, and said cores have shoulders 23, whereby ledges will be formed in the bottom of the recesses for convenience in handling the blocks.

As soon as the individual molds have been filled the temporary supports for the cores are removed and the cores discharged into the space beneath the movable floors. The side walls are then released and tilted to an inclined position, the outside wall is swung down, and the block can then be lifted, with the movable floor, off the platform and the operation of molding repeated.

I claim as my invention—

1. The combination, with a suitable frame, of removable floors having a series of core-holes arranged thereon, cores fitting within said holes, means for supporting said cores, side walls mounted on said platform, and partition or cross walls hinged at their lower edges to said frame and adapted to be swung down to a horizontal position, for convenience in emptying the molds, and a rigid cross-wall arranged intermediate to said hinged cross-walls, substantially as described.

2. In a mold for building-blocks, a frame having a series of cross-bars in rows at intervals thereon, a fixed partition-wall provided on the middle bar, and a series of partition-walls hinged upon each side of said fixed wall.

3. In a mold for building-blocks, the combination, with a frame provided with a series of cross-bars arranged with a space between them thereon, side and partition walls, and removable floors provided on said bars between said partition-walls and having a series of core-holes, and cores temporarily supported within said core-holes, substantially as described.

4. In a mold for building-blocks, the combination, with a frame, of side and partition walls thereon, a removable floor having a series of core-holes and cross-bars resting upon said frame and forming a space between it and said removable floor, and retaining-straps provided on said side walls opposite the ends of said movable floor.

5. A mold for building-blocks comprising a frame having a series of cross-bars arranged at intervals with spaces between them, a series of partition-walls arranged lengthwise on said cross-bars, the middle wall of the series being fixed and the others being hinged at their lower edges to their respective bars, removable floors having a series of core-holes arranged upon said bars between the pairs of partition-walls, cores fitting within said holes, means for temporarily supporting said cores in said holes, and side walls connecting the ends of said partition-walls, substantially as described.

6. In a mold for building-blocks, the combination, with a frame provided with side and partition walls forming a series of molds, each mold having an open bottom, removable floors fitting within said molds and each having a series of core-holes oval in form, extending lengthwise thereof above the open bottoms of said molds, cores tapered from the bottom toward the top arranged to be inserted into said holes from beneath, and means for temporarily supporting said cores in said holes.

7. A mold for building-blocks comprising a frame having a series of cross-bars arranged at intervals with spaces between them, partition-walls arranged lengthwise upon said bars, removable floors resting upon said bars over the spaces between them and having a series of core-holes, cores adapted to be inserted into said holes from beneath through said spaces, means for temporarily supporting said cores in said holes, and side walls connecting the ends of said partition-walls, substantially as described.

8. The combination, with a frame provided with standards 4 on each side and cross-bars 4' connecting said standards there being a space provided between said cross-bars, side and partition walls supported upon said bars, the middle partition-wall being rigidly secured to its bar, and the partition-walls intermediate to said middle one and the ends of said mold being hinged on their bars, removable floors arranged between said partition-walls and having core-holes therein, and means for supporting cores in said holes, substantially as described.

In witness whereof I have hereunto set my hand this 2d day of May, 1904.

WILLIAM PORTEN.

In presence of—
 RICHARD PAUL.
 M. HAGERTY.